United States Patent
Hayashi et al.

(10) Patent No.: US 6,825,948 B1
(45) Date of Patent: Nov. 30, 2004

(54) GROUP PRINT, AND PRINT SYSTEM AND METHOD FOR MAKING GROUP PRINT

(75) Inventors: Ryoichi Hayashi, Tokyo (JP); Eiichi Kito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/391,368

(22) Filed: Sep. 8, 1999

(30) Foreign Application Priority Data

Sep. 9, 1998 (JP) .......................................... 10-255683
May 26, 1999 (JP) .......................................... 11-145915

(51) Int. Cl.$^7$ .............................................. G06F 15/00
(52) U.S. Cl. ....................... 358/1.18; 358/302; 358/501
(58) Field of Search ................................. 358/302, 501, 358/527, 1.18, 487; 355/40, 77, 18; 347/247

(56) References Cited

U.S. PATENT DOCUMENTS

| | | | | |
|---|---|---|---|---|
| 4,920,423 A | * | 4/1990 | Shiota | ........................ 386/46 |
| 5,745,252 A | * | 4/1998 | Rauh et al. | ................. 358/502 |
| 6,130,740 A | * | 10/2000 | DeClerck et al. | ............. 355/18 |
| 6,154,295 A | * | 11/2000 | Fredlund et al. | ............ 358/487 |
| 6,327,048 B1 | * | 12/2001 | Wen | .......................... 358/1.18 |
| 6,348,940 B1 | * | 2/2002 | Sano et al. | ................. 347/247 |
| 6,396,963 B2 | * | 5/2002 | Shaffer et al. | .............. 382/305 |

* cited by examiner

Primary Examiner—Twyler Lamb
(74) Attorney, Agent, or Firm—Sughrue Mion, PLLC

(57) ABSTRACT

A group print contains a main frame and a plurality of smaller sub frames arranged on one side or on two or three sides of the main frame, or around the main frame. The sub frames contains pictures relating to a picture of the main frame. To make the group print, the main frame is selected from among a plurality of picture frames, and the sub frames are selected from among those picture frames photographed in series with the main frame, or those having the same group ID data as the main frame. Then, image data of the main and sub frames are synthesized in according with a predetermined group print format to produce print image data, such that the main frame is merged in a main frame print area, and the sub frames are reduced in size and merged in a sub frame print area that is located adjacent to the main frame print area.

26 Claims, 9 Drawing Sheets

GROUP PRINT, AND PRINT SYSTEM AND METHOD FOR MAKING GROUP PRINT

BACKGROUND OF THE INVENTION

1. Field of the Invention

The present invention relates to a group print containing a main frame and a plurality of smaller sub frames that relate to the main frame, and a print system for making the group print.

2. Background Arts

According to a recent print system, an index print is provided in addition to a series of standard photo-prints made from picture frames recorded on a filmstrip, to show small size abridged pictures of all the frames on a sheet.

Since the same size frames are arranged in a simple matrix, and the quality of each picture on the index print are low, the index print is only useful as an index. Furthermore, it is difficult to observe the detail of each picture frame on the index print. To check the detail, it is necessary to observe the individual photo-prints. However, it is difficult to see correlations between the individual picture frames just by observing the individual photo-prints.

SUMMARY OF THE INVENTION

In view of the foregoing, an object of the present invention is to provide a print system that provides a print which allows to observe the detail of each picture frame and shows a relation with other picture frames as well, and is also attractive as a graphic art.

To achieve the above object, the present invention provides a group print containing a main frame and a plurality of sub frames that are smaller than the main frame and arranged adjacent to the main frame, that is, on one side or on two or three sides of the main frame or around the main frame. The sub frames contains pictures that relate to a picture printed as the main frame. According to a preferred embodiment, the sub frames are those picture frames photographed in series with the main frame, that is, before and/or after the main frame on the same image recording medium, e.g. a filmstrip.

The group print according to the present invention makes it possible to observe the detail of the picture of the main frame, and also shows the relation of the main frame with other pictures as well as the correlation between other pictures. The group print may contain two or more main frames thereon. The sub frames may have different size from each other. By modifying the number, size and layout of the sub frames appropriately, the group print becomes not only useful but also attractive. It is preferable to extract those pictures as the sub frames which belong to the same group as the picture of the main frame.

An apparatus for producing print image data that is used for printing the group print is comprised of a device for selecting the main frame from among a plurality of picture frames; a device for selecting the sub frames from among those picture frames which relate to the main frame; and a device for synthesizing image data of the main and sub frames in accordance with a predetermined group print format to produce the print image data, such that the main frame is merged in a main frame print area, and the sub frames are reduced in size and merged in a sub frame print area that is located adjacent to the main frame print area.

The image data may be detected by use of a film scanner from the picture frames when they are photographed on a filmstrip. Alternatively, when the picture frames are photographed by a digital camera or the like, the image data from the digital camera is processed to produce the print image data for the group print.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limiting the present invention, wherein like reference numerals designate like or corresponding parts throughout the several views, and wherein:

FIG. 12 is an explanatory view of a group print according to still another embodiment of the invention; and FIG. 13 is an explanatory view of a group print according to a further embodiment of the invention.

DETAILED DESCRIPTION OF THE PREFERRED EMBODIMENT

Figure 1:
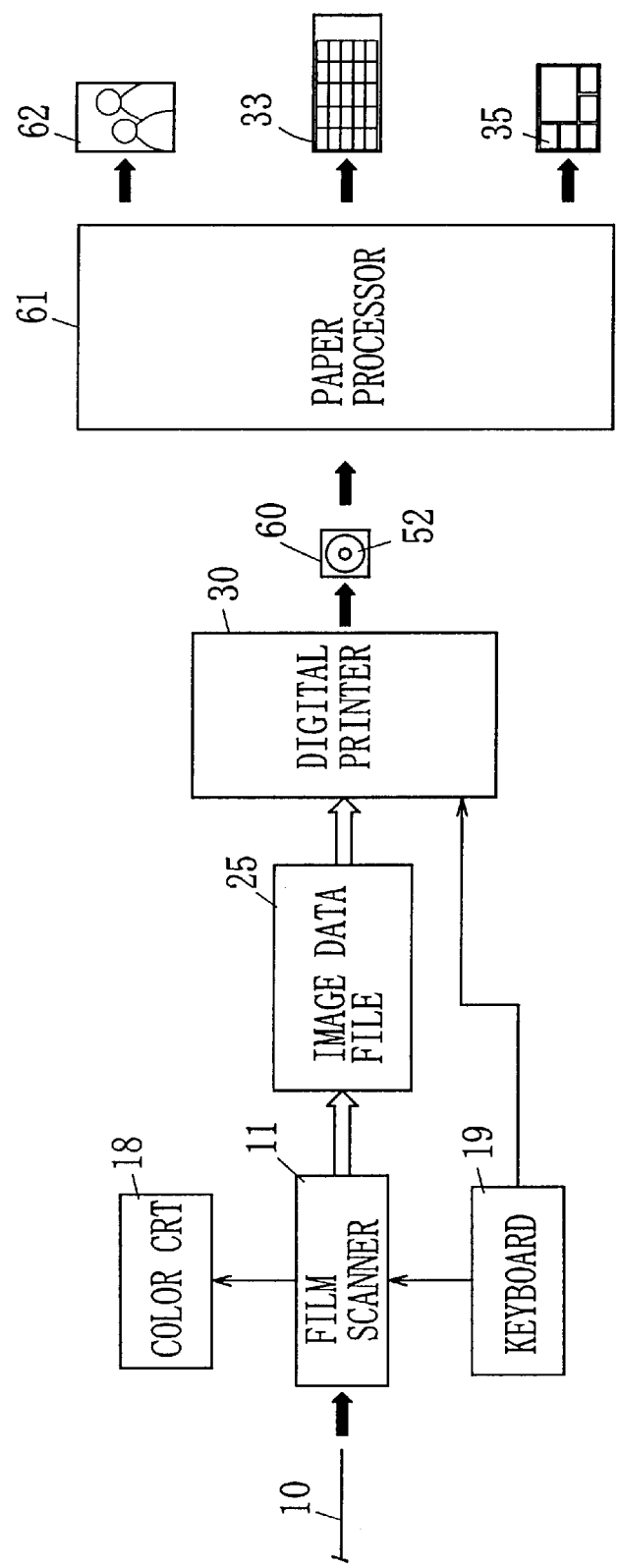
FIG. 1 is a schematic diagram illustrating a print system according to an embodiment of the present invention.
Figure 2:
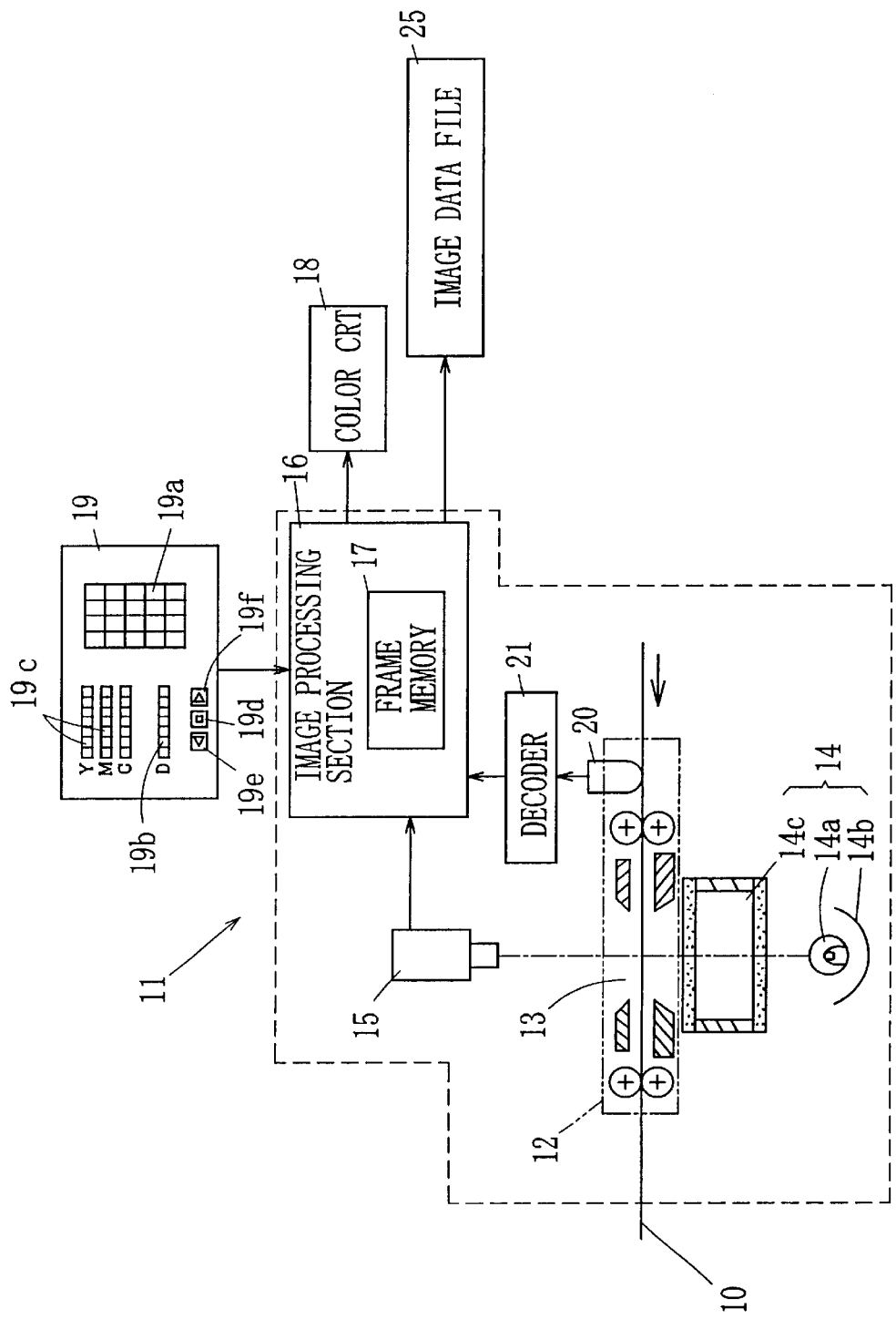
FIG. 2 is a schematic diagram illustrating a film scanner of the print system of FIG. 1.

In a print system shown in FIG. 1, a web of developed photo film 10 is set in a film scanner 11. As shown in FIG. 2, the film scanner 11 is provided with a film carrier 12 through which picture frames on the photo film 10 are seriatim positioned at a photometry stage 13. In the photometry stage 13, each picture frame is illuminated by a light source 14, so an imaging device 15, an area image sensor in this embodiment, picks up an image signal from the illuminated picture frame. The light source 14 consists of a lamp 14a, a reflector 14b and a diffusion box 14c.

The photo film 10 is made by splicing a plurality of filmstrips of the same film type, e.g. 80 filmstrips of IX 240 type or those of conventional 135 type, into a web. The IX 240 type filmstrips have a magnetic recording layer on one whole surface thereof, so it is possible to record photographic data and print order data on the magnetic recording layer by the camera for each frame after each exposure. The photographic data represents date and time of photography and a selected title, such as "BIRTHDAY", "CONGRATULATIONS!". The print order data designates a print size, the number of prints to make from the individual picture frame and a print format or print aspect ratio.

The image signal from the area image sensor 15 is converted into digital image data of three colors: red (R), green (G) and blue (B) through logarithmic conversion and analog/digital conversion in an image processing section 16. The image data is stored for each color in frame memories 17 that are provided for each color in the image processing section 16. The three color image data is read out from the frame memories 17 while being decimated, and is processed in the image processing section 16 so as to display a video image simulating a finished print on a color CRT 18. The operator can enter correction values through a key board 19 when it is determined to be necessary from the simulation image.

The key board 19 has density correction keys 19b and color corrections keys 19c for entering a density correction value and color correction values for three colors: yellow (Y), magenta (M) and cyan (C), in addition to alphanumeric keys 19a. In correspondence with the entered correction values, the image processing section corrects the decimated image data, so a corrected simulation image is displayed on the color CRT 18.

If the corrected simulation image looks good, the operator operates a frame advance key 19d. Then, the image data read out from the frame memories 17 is corrected with the finally entered correction values, and the corrected image data is sent to an image data file 25. Also, in response to the frame advance key 19d being operated, the photo film 10 is advanced one frame to set the next picture frame at the photometry stage 13. Designated by 19e and 19f are fine adjustment keys that allows to manually adjust the position of the picture frame at the photometry stage 13.

A magnetic reading head 20 is located at an entrance of the film carrier 12, for reading out photographic data and print order data from the magnetic recording layer of the photo film 10 when it is of IX 240 type. The data read out from the magnetic recording layer is converted by a decoder 21 into a form usable in a digital printer 30, and is sent to the image processing section 16.

When the photo film 10 consists of 135 type filmstrips, there is no magnetic data recorded thereon, so print order data is entered through the key board 19 with reference to the information written on a specific envelope at each reception of a print order to a photo-lab or an agency of the photo-lab. Even when the photo film 10 is of IX 240 type, if there is no print order data recorded on the magnetic recording layer, the operator may enter the print order data through the keyboard 19 with reference to the contents written on the envelope.

The corrected image data is sent to the image data file 25, and is stored in the order of photographic date and time, along with the print order data of each picture frame. The image data file 25 is a large capacity memory that can store image data of a predetermined large number of picture frames.

Figure 3:
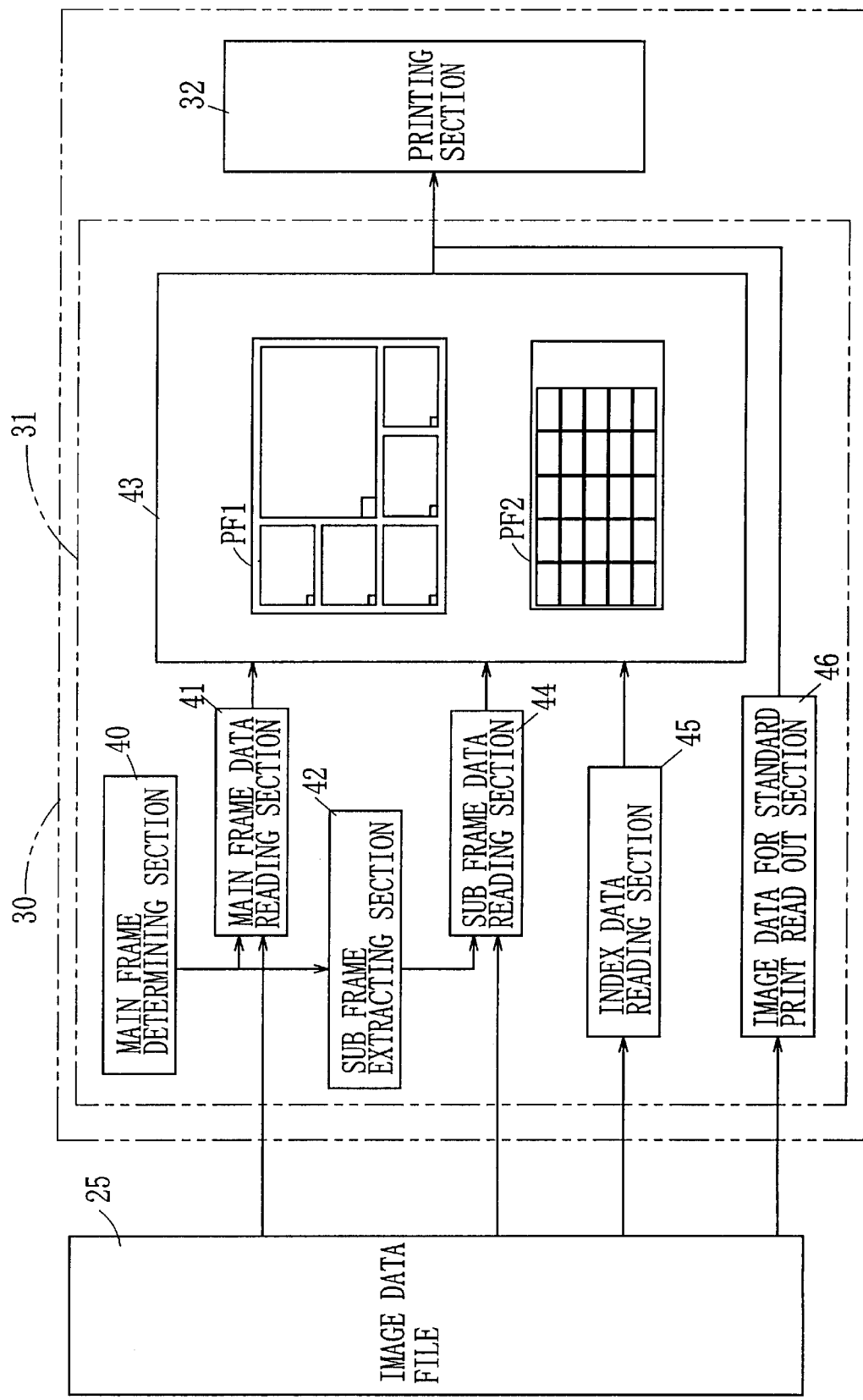
FIG. 3 is a schematic diagram illustrating a digital printer of the print system of FIG. 1.

As shown in FIG. 3, the digital printer 30 consists of a print image producing section 31 and a printing section 32. As set forth in detail below, the digital printer 30 can produce a standard print 62, an index print 33 or a group print 35 on the basis of the image data and the print order data read out from the image data file 25. Which kind of print is to produce is designated through the keyboard 19.

Figure 4:
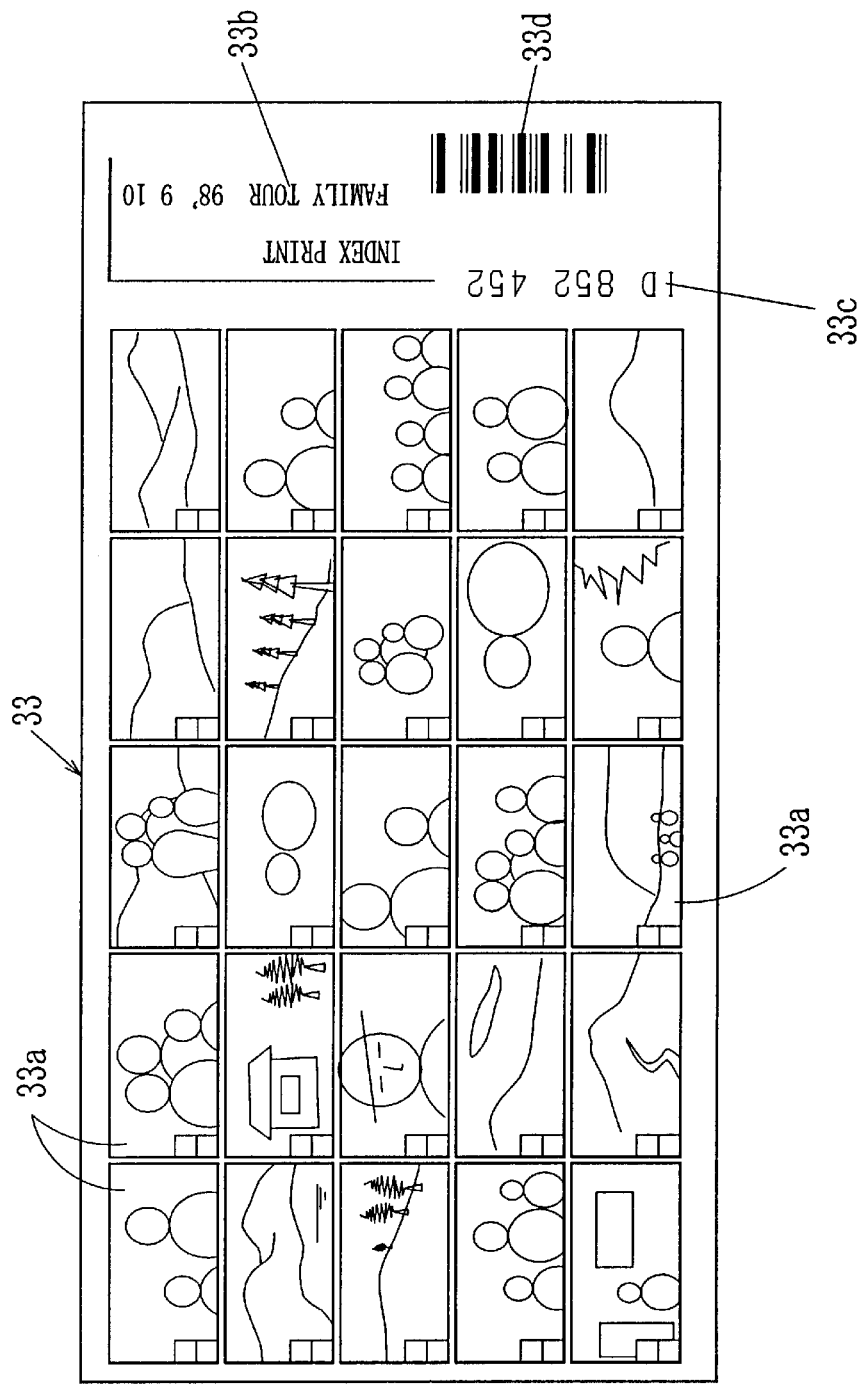
FIG. 4 is an explanatory view of an index print.
Figure 5:
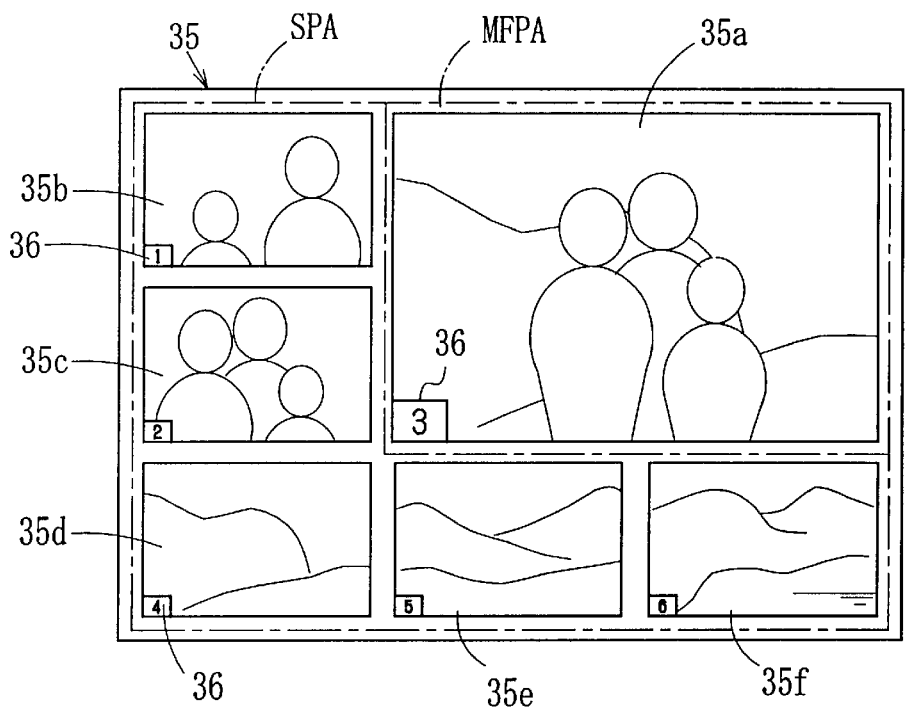
FIG. 5 is an explanatory view of an example of group print produced by the print system of FIG. 1.

FIG. 4 shows an example of index print 33, and FIG. 5 shows an examples of group print 35 produced by the print system of the present invention. As known in the art, the index print 33, all of those picture frames which are originally recorded on the same filmstrip are recorded as a matrix of small size picture frames 33a, hereinafter called index frames 33a. Besides the index frames 33a, the index print 33 has a title 33b, "FAMILY TOUR" in this instance, an ID number 33c and a bar code 33d representative of the ID number 33c thereon.

On the other hand, the group print 35 contains a large size main frame 35a and several sub frames 35b, 35c, 35d, 35e and 35f which are smaller in size than the main frame 35a. The main frame 35a is printed in a main frame print area MFPA, whereas the sub frames 35b to 35f are printed in a sub print area SPA. In the example shown in FIG. 5, the sub print area SPA is of L-shaped and extends on left and bottom sides of the main frame print area MFPA. Frame serial numbers 36 of the respective frames 35a to 35f are printed on a left bottom corner of each frame.

When to produce the index print 33, image data of all picture frames recorded on the same filmstrip is read out from the image data file 25 through an index data read out section 45, and is processed in an image synthesizer 43 so as to be fit in an index print format PF2. Specifically, the image data of each picture frame is compressed by decimation or the like, to reduce the size of frame so as to be merged in each segment allocated to one index frame 33a in the index print format PF2. Instead of decimating the image data in the image synthesizer 43, it is possible to make a decimation of the image data by the index data reading section 45 while the image data is being read. The image data processed to be fit in the index print format PF2 is sent to the printing section 32.

When to produce the standard print 62, image data of a designated picture frame is read out from the image data file 25 through an image data for standard print read out section 46, and is sent directly to the printing section 32.

Concerning the group print, a particular picture frame is designated to be the main frame, or every picture frame on a filmstrip is printed in turn as the main frames. In either case, a main frame determining section 40 determines a picture frame to be the main frame, and sends the frame serial number of the main frame to a main frame data reading section 41 and a sub frame extracting section 42. The main frame data reading section 41 reads image data of the picture frame with that frame serial number out of the image data file 25, and sends it to the image synthesizer 43.

The sub frame extracting section 42 determines sub frames on the basis of the frame serial number of the main frame. According to the embodiment shown in FIG. 5, preceding two picture frames and succeeding three picture frames to the main frame are selected as the sub frames. In the group print 35 shown in FIG. 5, a picture frame #3 is designated to be the main frame 35a, and picture frames #1, #2, #4, #5 and #6 that are recorded in series with the picture frame #3 on the same filmstrip are printed as the sub frames 35b to 35f.

Figure 6:
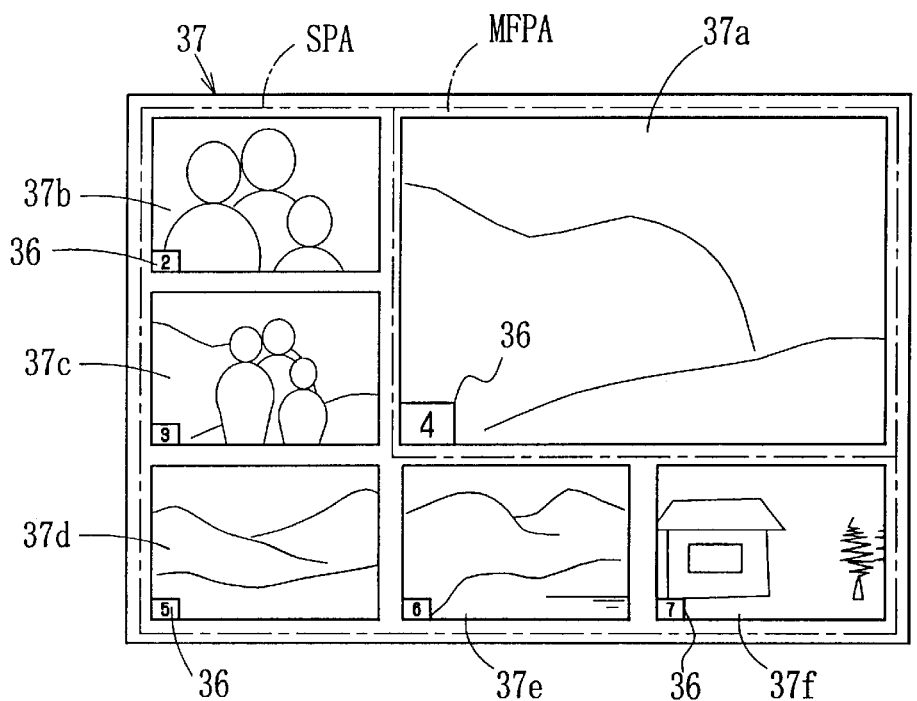
FIG. 6 is an explanatory view of another example of group print produced by the print system of FIG. 1.

FIG. 6 shows another example of group print 37 that is formed in the same way as the group print 35, but the picture frame #4 is designated to be the main frame 37a. In this case, the picture frames #2, #3, #5 and #6 and a picture frame #7 are printed as the sub frames 37b to 37f from among those picture frames recorded on the same filmstrip as the picture frame #4. But where the picture frame #1 is the main frame, succeeding five picture frames #2 to # 6 are selected as the sub frames. Where the picture frame #2 is the main frame, preceding one picture frame #1 and succeeding four picture frames #3 to # 6 are selected as the sub frames. Also, where the last picture frame on an individual filmstrip is to be the main frame, preceding five picture frames are selected as the sub frames.

A sub frame data reading section 44 reads out image data of the sub frames from the image data file 25, and sends it to the image synthesizer 43. The image synthesizer 43 processes the image data of the main frame and that of the sub frames to be fit in a group print format PF1. Specifically, the image data is processed such that the main frame is printed in the main frame print area MFPA, whereas the sub frames are reduced in size by decimation or the like, and printed in an array in the sub frame print area SPA. The processed image data for the group print is sent to the printing section 32.

Figure 7:
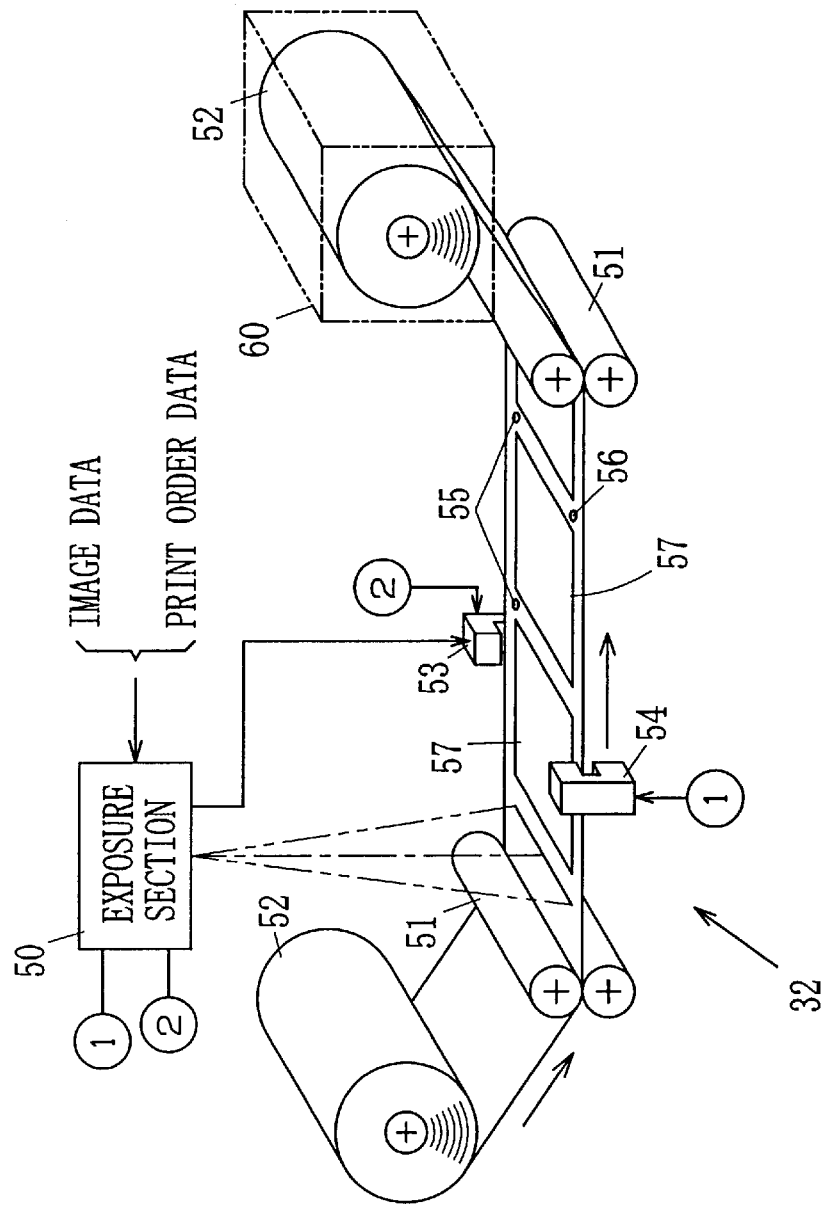
FIG. 7 is a schematic diagram illustrating a printing section of the digital printer of the print system of FIG. 1.

The printing section 32 is provided with a Laser-type exposure section 50, as shown in FIG. 7. While photographic color paper 52 is transported by paper feed rollers 51, the exposure section 50 sweeps across the color paper 52 with Laser beams in a main scanning direction orthogonal to the paper transporting direction. Thus, a picture 57 is printed line by line on the color paper 52, synchronously with the paper transport.

The color paper 52 is provided with cut marks 55 and sort marks 56 by punchers 53 and 54. The cut mark 55 is a small hole formed in one side margin of the color paper 52 between the printed pictures 57, to indicate the position to cut the color paper 52 into the individual pictures 57. The sort mark 56 is also a small hole formed in the other side margin of the color paper 52, to discriminate between different series of pictures 57, each series being originated from picture frames of the individual filmstrip. The cut and sort marks 55 and 56 can also be provided photographically by use of the exposure section 50, or printed on the color paper 52 by use of a side printer.

To produce the standard print 62, the exposure section 50 prints one picture frame in a full size. To produce the index print 33 or the group print 35, the exposure section 50 is driven based on the image data synthesized according to the index print format PF2 or the image data synthesized according to the group print format PF1 respectively.

Referring back to FIG. 1, the color paper 52 after having the pictures 57 printer thereon is rewound into a paper magazine 60, and is loaded in a paper processor 61. The paper processor 61 develops the color paper 52 and cuts the developed color paper 52 at the cut marks 55, providing the index print 33, the group print 35 and/or the standard print 62. These prints 33, 35 and 62 are sorted according to the original filmstrip with reference to the sort mark 56, and each set of prints are enclosed with the developed original filmstrip into a specific enveloped.

Although five picture frames adjacent to the main frame are extracted as the sub frames in the above embodiment, the number of sub frames as well as the order of arrangement thereof on the group print may be modified appropriately. For example, it is possible to record group ID data for each picture frame, in order to sort the picture frames into some groups according to the group ID data, and extract the sub frames from among those picture frames which belong to the same group as the main frame. The group ID data may be recorded at each exposure by the camera, or by use of a specific device at the photo-lab or at the photo-lab agency.

Also, size and layout of the main frame print area MFPA and the sub frame print area SPA of the group print format PF1 as well as the number of frames contained in a group print may be modified in many ways.

Figure 8:
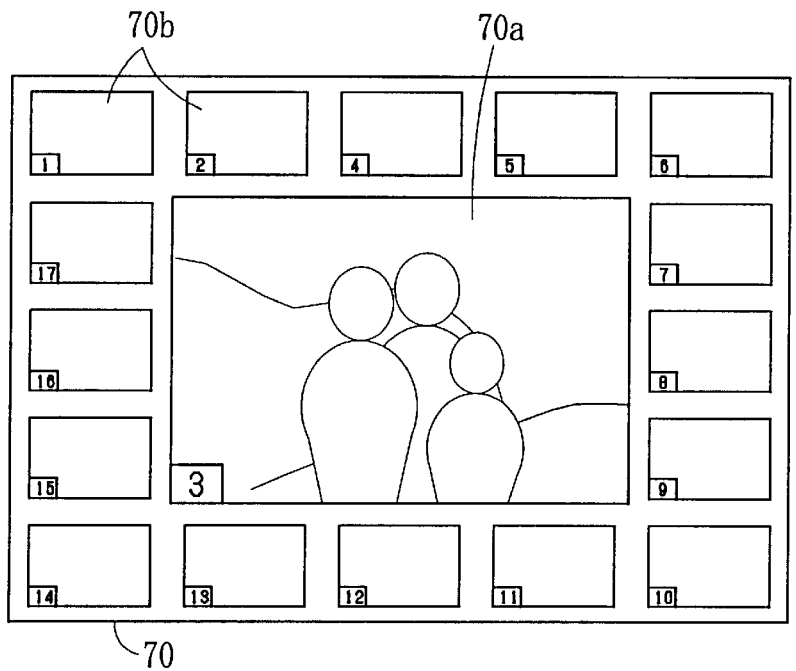
FIG. 8 is an explanatory view of a group print according to another embodiment of the invention.
Figure 9:
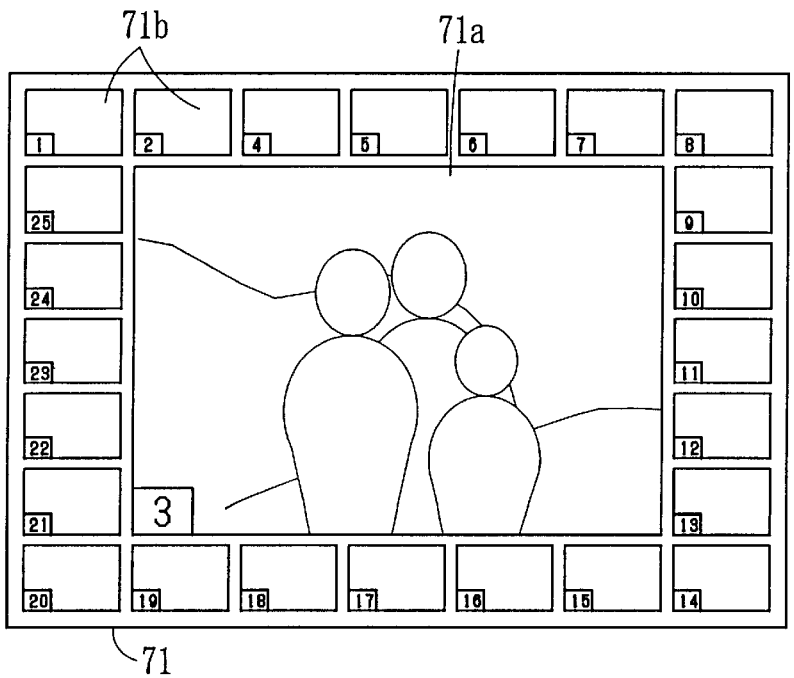
FIG. 9 is an explanatory view of a group print according to still another embodiment of the invention.

For example, as shown in FIG. 8, sub frames 70b may be arranged to surround a main frame 70a on a group print 70. The number of surrounding sub frames 70b may be determined appropriately. For example, as shown in FIG. 9, a main frame 71a is located in a center of a group print 71, and all other picture frames recorded on the same filmstrip as the main frame 71a are printed as sub frames 71b around the main frame 71a. Thereby, the group print 71 doubles as an index print.

Figure 10:
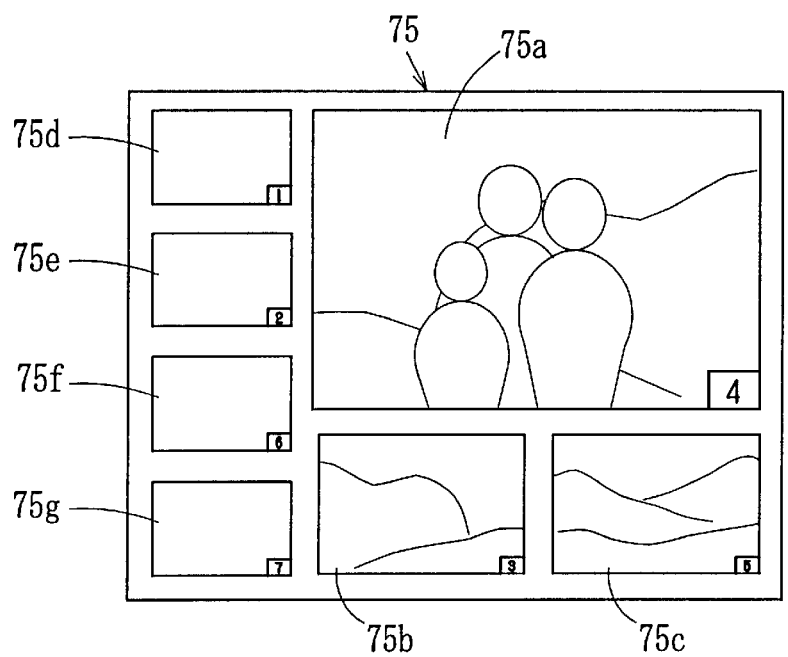
FIG. 10 is an explanatory view of a group print according to a further embodiment of the invention.

The sub frames may have different sizes within a group print. For example, as shown in FIG. 10, a group print 75 may contains a large main frame 75a, middle size sub frames 75b and 75c, and small sub frames 75d, 75e, 75f and 75g. The number of the middle size sub frames is preferably one to three, but may be modified appropriately. According to the embodiment of FIG. 10, the middle size sub frames 75b and 75c are those picture frames disposed on opposite sides of the main frame 75a on the filmstrip, and the small sub frames 75d to 75g are those picture frames preceding to the former middle size picture frame 75b and those succeeding to the latter middle size picture frame 75c. However, the sequence of the sub frames 75b to 75g may be modified appropriately. The sub frames 75b to 75g may be selected from among the same group of picture frames as the main frame 75a when each picture frame is provided with the group ID data or the like.

Figure 11:
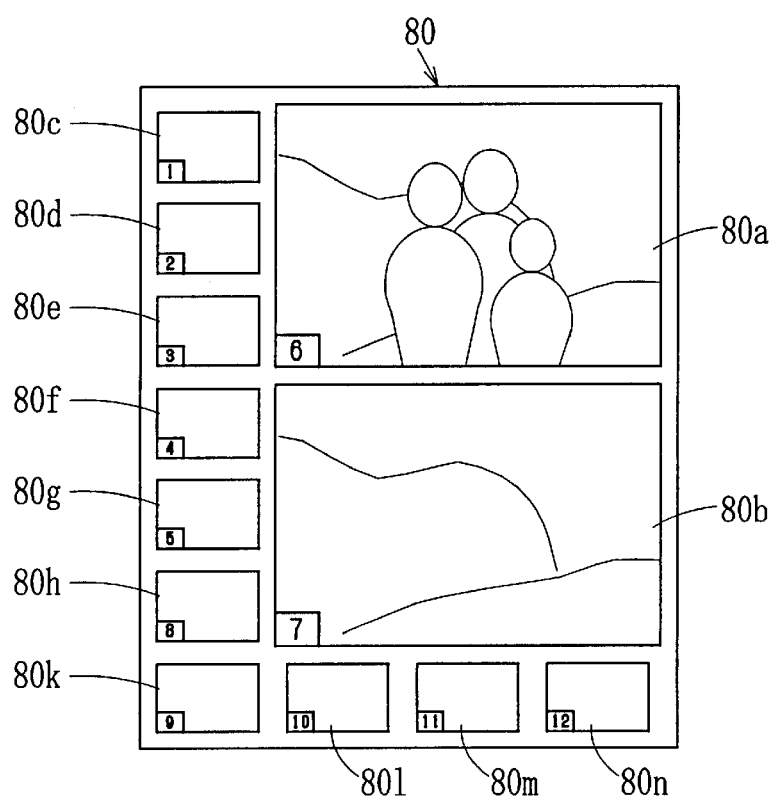
FIG. 11 is an explanatory view of a group print according to another embodiment of the invention.
Figure 1:
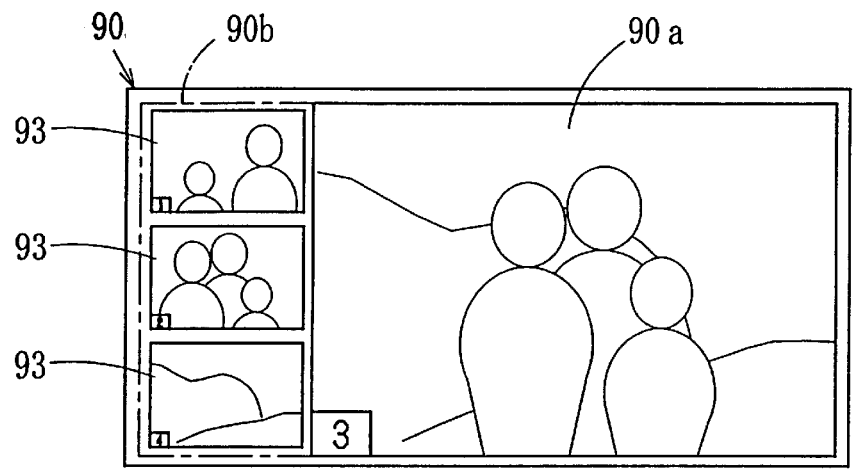
Figure 1:
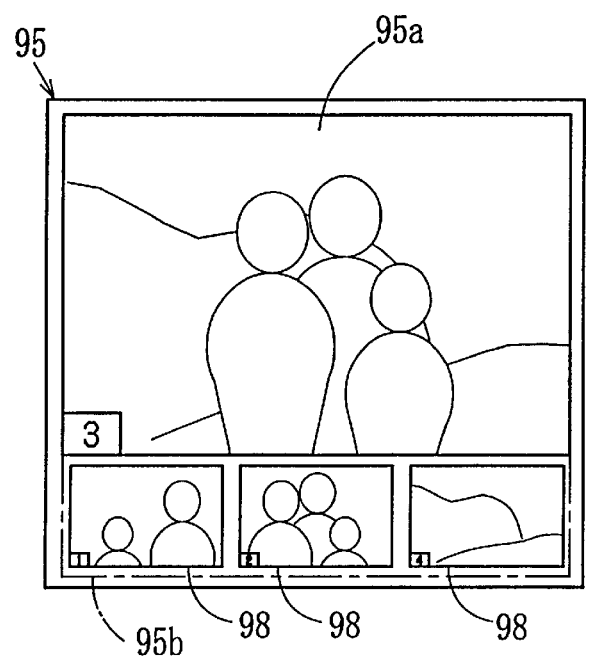

It is also possible to provide two or more main frames 80a and 80b on a group print 80, as shown in FIG. 11. In this embodiment, those picture frames preceding and/or succeeding to the main frames 80a and 80b may be selected as sub frames 80c to 80n. The sub frames 80c to 80n may be selected from among the same group of picture frames as the main frames 80a and 80b when each picture frame is provided with the group ID data or the like.

FIG. 12 shows another example of group print 90 wherein a sub frame print area 90b is located on the left side of a main frame 90a. FIG. 13 shows a further example of group print 95 wherein a sub frame print area 95b is located on the bottom side of a main frame 95a. In these embodiments, three sub frames 93 or 98 are printed in the sub print area 90b or 95b, but the number of sub frames 93 or 98 may be modified appropriately, preferably in a range from three to five.

The sub frames may be arranged on three sides of the main frame, or on four corners of the main frame. Although the sub frames are aligned in a row or a column in the shown embodiments, the sub frames may be arranged in rows or columns within a sub frame print area. It is possible to stagger the sub frames from each other. It is preferable to record posture data indicating the scene posture of each picture frame along with its image data, and orient the main and sub frames vertically or horizontally on the group print depending upon the posture data.

It is possible to print photographic information on one of the segments of the sub frame print area in place of a picture, or blank some segments of the sub frame print area so that the user can write in memos or the like on the group print.

Although the digital printer 30 makes the standard print, the index print and the group print in the above embodiment, it is possible to provide specific printers for each kind of print. In that case, it is preferable to load color paper of an optimum size in each printer. The Laser-type exposure section 50 may be replaced by a CRT-type exposure section, an LCD-type exposure section, or a line exposure device.

It is possible to use a digital printer-processor unit instead of the digital printer 30 and a paper processor 61. The group print or the index print or the standard print may be printed on any recording medium other than the photographic color paper 10. It is possible to produce these prints by use of a thermosensitive digital printer, a thermal transfer type digital printer, or an ink-jet type digital printer. It is possible to record printer type data along with the image data to select the printer type in accordance that data. It is also possible to automatically determine the printer depending upon the print size to make.

Although the image data from the imaging device 15 is corrected in the film scanner 11 while observing the simulation image, and the corrected image data is stored in the image data file 25 in the above embodiment, it is possible to store the image data from the imaging device 15 along with correction data and the print order data as well in the image data file 25, and correct the image data with the correction data in the digital printer 30. It is also possible to determine a correction amount automatically in the image processing section 16. Instead of storing the image data and the print order data in the image data file 25, it is possible to send them directly to the digital printer and store them in a buffer memory built in the digital printer.

It is not always necessary to splice a plurality of filmstrips to scan the picture frames, but it is of course possible to set each individual filmstrip in the film carrier 12. As for IX 240 type filmstrip, it is preferable to provide the film carrier 12 with a device for advancing the filmstrip out of a cartridge shell to position each frame in the printing stage 13.

Instead of synthesizing image data in accordance with the group print format PF1 or the index print format PF2 in the digital printer 30, it is possible to synthesize image data in the film scanner 11. The area image sensor 15 may be replaced by a line image sensor. In that case, the photo film 10 is transported continuously, and the line image sensor is driven synchronously with the transport.

The present invention is applicable to produce a group print or an index print from image data taken by a digital camera or the like, or image data sent from a personal computer or read out from an image data memory.

Thus, the present invention is not to be limited to the embodiments shown in the drawings but, on the contrary, various modifications are possible to those skilled in the art without departing from the scope of appended claims.

What is claimed is:

1. A group print is a single print comprising a single sheet of paper, said sheet of paper including a main frame and a plurality of sub frames that are smaller than the main frame and arranged adjacent to the main frame, wherein the main frame contains a picture;

wherein the sub frames contain pictures that relate to the picture of the main frame, said sub frame pictures are selected from a plurality of picture frames recorded on an image recording medium except for the picture frame recorded on the image recording medium that is selected for the main frame picture;

wherein the main frame and sub frames substantially conform to the size of the sheet of paper;

wherein one or more first sub frames have different sizes than one or more second sub frames;

wherein each side of each sub frame is shorter than every side of the main frame; and wherein the sub frames are arranged on one side or on two or three sides of the main frame, or around the main frame.

2. A group print as claimed in claim 1, wherein the sub frames are selected from among those picture frames photographed before and/or after the main frame on the same image recording medium.

3. A group print as claimed in claim 2, wherein the image recording medium is a photo filmstrip.

4. A group print as claimed in claim 1, wherein the sub frames are selected from among those picture frames which belong to the same group as the main frame.

5. A group print as claimed in claim 1, wherein more than one main frame is printed thereon.

6. A group print as claimed in claim 1, wherein each frame is provided with a frame serial number.

7. A group print as claimed in claim 1, wherein a first area of each first sub frame differs from a second area of each second sub frame.

8. The group print as claimed in claim 1, said group print having a single main frame.

9. An apparatus for producing print image data used for printing a group print, which is a single print that contains a main frame and a plurality of smaller sub frames, one or more first sub frames having different sizes than one or more second sub frames, the apparatus comprising:

a device for selecting the main frame from among a plurality of picture frames;

a device for selecting the sub frames from among those picture frames which relate to the main frame, said sub frames are selected from the plurality of picture frames recorded on an image recording medium except for the picture frame recorded on the image recording medium that is selected for the main frame; and a device for synthesizing image data of the main and sub frames in accordance with a predetermined group print format to produce the print image data, such that the main frame is merged in a main frame print area, and the sub frames are reduced in size and merged in a sub frame print area that is located adjacent to the main frame print area, wherein the sub frames are arranged on one side or on two or three sides of the main frame, or around the main frame and wherein each side of each sub frame is shorter than every side of the main frame.

10. An apparatus as claimed in claim 9, further comprising a device for printing the group print based on the print image data.

11. An apparatus as claimed in claim 9, further comprising a device for taking out image data of the plurality of picture frames from an image recording medium.

12. An apparatus as claimed in claim 11, wherein the image recording medium is a filmstrip, and a film scanner takes out the image data from the filmstrip.

13. An apparatus as claimed in claim 11, further comprising a device for reading out information allocated to each picture frame from the image recording medium or a data recording medium.

14. An apparatus as claimed in claim 13, wherein the information includes print order data designating a print size, a print format and the number of prints to make from each picture frame.

15. An apparatus as claimed in claim 13, wherein the information includes group ID data for sorting the picture frames into one or more groups, and the sub frames are selected from among those picture frames which belong to the same group as the main frame.

16. An apparatus as claimed in claim 9, wherein a first area of each first sub frame differs from a second area of each second sub frame.

17. A print system for making a group print, which is a single print containing a main frame and a plurality of sub frames that are smaller than the main frame and arranged adjacent to the main frame, the apparatus comprising:

a device for allocating group ID data to each of a plurality of picture frames photographed on an image recording medium, the group ID data being representative of a group the picture frame belongs to;

a device for taking out image data of the plurality of picture frames from the image recording medium;

a device for selecting the main frame from among the plurality of picture frames;

a device for selecting the sub frames from among those picture frames which belong to the same group as the main frame with reference to the group ID data, said sub frames are selected from the plurality of picture frames recorded on the image recording medium except for the picture frame recorded on the image recording medium that is selected for the main frame, wherein one or more first sub frames have different sizes than one or more second sub frames;

a device for synthesizing the image data of the main and sub frames in accordance with a predetermined group print format to produce print image data, wherein the sub frames are arranged on one side or on two or three sides of the main frame, or around the main frame and wherein each side of each sub frame is shorter than every side of the main frame; and a device for printing the group print based on the print image data.

18. A print system as claimed in claim 17, wherein a first area of each first sub frame differs from a second area of each second sub frame.

19. A method of producing a group print, which is a single print, comprising:

(a) specifying a main frame position;

(b) arranging a plurality of sub frames adjacent to the main frame, wherein the sub frames are arranged on one side or on two or three sides of the main frame, or around the main frame;

(c) selecting a main image from a plurality of images;

(d) selecting a plurality of sub images from the plurality of images, said sub images are selected from a plurality of picture frames recorded on an image recording medium except for the picture frame recorded on the image recording medium that is selected for the main image;

(e) printing the main image in the main frame; and (f) printing the sub images in the sub frames, wherein the sub frames are smaller than the main frame in that each side of each sub frame is shorter than every side of the main frame;

wherein the selected sub images relate to the main image; and wherein one or more first sub frames differ in size from one or more second sub frames.

20. The method of claim 19, wherein the plurality of sub images are selected from among those images recorded before and/or after the main frame on the same image recording medium.

21. The method of claim 20, wherein the image recording medium is a photo filmstrip.

22. The method of claim 19, wherein the plurality of sub images are selected from among those images which belong to the same group as the main image.

23. The method of claim 19, wherein a plurality of main frames is specified.

24. The method of claim 19, further comprising:

printing a frame serial number in the main frame and each sub frame.

25. The method of claim 19, wherein the plurality of images, excluding the main image, are selected as sub images.

26. The method of claim 19, wherein a first area of each first sub frame differs from a second area of each second sub frame.

* * * * *